Nov. 11, 1930.  T. C. DELAVAL-CROW  1,781,219

MOUNTING FOR PINION SHAFT OF REAR AXLE

Filed Dec. 14, 1928

INVENTOR:
THOMAS C. DELAVAL-CROW,

BY Gales P. Moore

HIS ATTORNEY.

Patented Nov. 11, 1930

1,781,219

UNITED STATES PATENT OFFICE

THOMAS C. DELAVAL-CROW, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT

MOUNTING FOR PINION SHAFT OF REAR AXLE

Application filed December 14, 1928. Serial No. 326,049.

Figure 1:
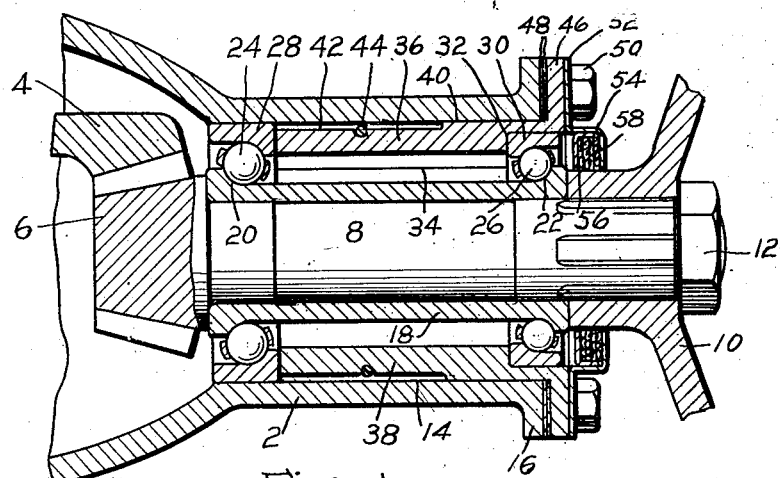
Figure 2:
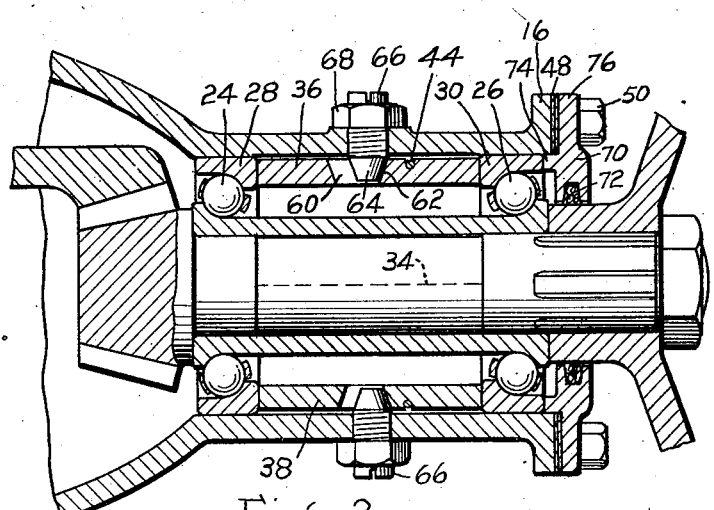

This invention relates to mountings for pinion shafts of rear axles and comprises all the features of novelty herein disclosed. An object of the invention is to provide a simple, inexpensive and easily assembled mounting for such shafts and one in which the adjustment of the pinion shaft can be easily effected and maintained. To these ends and to improve generally and in detail upon devices of this character, the invention further consists in the various matters herein disclosed and claimed. In its broader aspects, the invention is not necessarily limited to the specific constructions selected for illustrative purposes in the accompanying drawings in which Fig. 1 is a horizontal sectional view of a mounting for the pinion shaft of a rear axle and Fig. 2 is a similar view of another embodiment of the invention.

Automobiles commonly have a differential driving pinion at the rear end of a shaft mounted in axially movable antifriction bearings, one being a double row bearing and one a single row bearing, and the double row bearing or both bearings being carried by an adjusting sleeve threaded in a housing extending forwardly from the rear axle casing and often split so it can be clamped on the sleeve. The present invention simplifies the construction and provides a better adjustment for the pinion shaft.

The numeral 2 indicates a tubular carrier which projects forwardly from the usual rear axle housing. The usual ring gear 4 of the differential meshes with a drive pinion 6 which may be integral with the shaft 8 driven by a coupling disc or plate 10 keyed to the shaft and held by a nut 12. The carrier is unbroken circumferentially and has a straight, smooth bore 14 extending out to its open end which is reinforced by an annular flange 16.

A long sleeve or inner race ring 18 extends between the pinion 6 and the member 10 and is provided with angular contact raceways 20 and 22 facing towards one another for rolling elements, herein shown as rows of balls 24 and 26, respectively. The balls 24 engage an angular contact raceway on an outer race ring 28 which has a sliding fit in the bore 14. The balls 26 are smaller than the balls 24 and engage an angular contact raceway on an outer race ring 30 fitting against a shoulder 32 in a recess of a sleeve which is diametrically split as indicated by the joint line 34 into two sections 36 and 38.

The sectional sleeve has a portion of its periphery cylindrical as indicated at 40 for a sliding fit in the bore 14 and another portion 42 is reduced in diameter and provided with a peripheral groove for a split spring ring 44. The spring ring holds the sleeve sections together during their assembly in the bore. The ends of the sleeve sections abut at their ends against the race ring 28 and hold the race rings 28 and 30 spaced apart with an initial thrust load on the balls. The sleeve has an annular flange 46 at the end overlapping the flange 16, spacing washers 48 preferably split into sections and of selected thickness being interposed between the flanges. Bolts 50 hold the flanges together, the bolts also holding an outer ring or washer 52 which is cupped at 54 to enclose a washer 56 and a felt ring 58 surrounding the hub of the member 10 to retain lubricant.

During assembly, with the sleeve or inner race ring 18 fixed on the shaft and the rows of balls 24 and 26 on their raceways, the outer race ring 28 is moved axially in one direction to engage its balls and the outer race ring 30 is moved axially in the opposite direction to engage its balls. Before putting these parts in the tubular carrier 2, the sleeve sections 36 and 38 are put between the outer race rings by radial movement and held by the spring ring 44. After putting washers 48 of suitable thickness against flange 46, the assembled parts are slid into the bore 40 and clamped by the bolts 50.

Fig. 2 shows a form of the invention in which subsequent adjustment can be easily effected without removing the assembled bearing from the bore even if the washers 48 are not split into sections. Both outer race rings 28 and 30 having a sliding fit in the bore and the sleeve sections 36 and 38, meeting at 34, space them apart with an initial thrust load on the balls. Each sleeve section has one or more slots 60 with inclined end walls 62 engaged by the coned ends 64 of adjusting screws 66 threaded in the tubular carrier 2 and locked by nuts 68. The screws adjustably limit movement of the bearing parts inwardly of the bore. A ring or washer 70 carrying a felt washer 72 closes the end of the bore. The ring 70 has a flange 74 to engage the end of the race ring 30 and a flange 76 overlapping the flange 16 of the carrier with spacing washers 48 between. Clamping bolts 50 hold the ring 70, and the flange 74 holds the bearing from outward movement. A new adjustment can be effected without removing the bearing from the bore by removing the ring 70 and inserting spacing washers of the desired aggregate thickness. The cone ended screws are then adjusted to prevent any inward movement of the bearing in its new position.

With widely spaced rows of balls under an initial thrust load, there is minimum gear motion in any direction. The adjustment of the pinion shaft is accurately and rigidly maintained and is not likely to be disturbed by unskillful persons. Accurate shaft alignment is insured by the unbroken carrier 2 which is not distorted by clamping devices and the straight bore is easily machined.

I claim:

1. In an axle construction having a pinion shaft subject to end thrust, a tubular carrier projecting from the axle and having a smooth unbroken bore extending to its open end, a pinion at one end of the shaft and a driving member at the other, a long sleeve fixed on the shaft and extending from the pinion to the driving member, an angular contact raceway at the end of the sleeve adjacent to the pinion and an angular contact raceway at the end of the sleeve adjacent to the driving member, rolling elements running on the raceways, a pair of outer race rings mounted to slide axially as a unit along the bore wall, means for holding the outer race rings in a constant spaced relation with an initial thrust load on the rolling elements, and means for axially adjusting the assembled bearing structure within the bore of the carrier; substantially as described.

2. In an axle construction having a pinion shaft subject to end thrust, a tubular carrier projecting from the axle and having a smooth unbroken bore extending to its open end, a pinion at one end of the shaft and a driving member at the other, a long sleeve fixed on the shaft and extending from the pinion to the driving member, an angular contact raceway at the end of the sleeve adjacent to the pinion and an angular contact raceway at the end of the sleeve adjacent to the driving member, rolling elements running on the raceways, outer race rings mounted for axial movement within the bore, a split sleeve for holding the outer race rings apart with an initial thrust load on the rolling elements, means for adjustably limiting the axial movement of the sleeve in one direction, and means for holding said sleeve against the limiting means; substantially as described.

3. In an axle construction having a pinion shaft subject to end thrust, a tubular carrier projecting from the axle and having a smooth unbroken bore extending to its open end, a pinion at one end of the shaft and a driving member at the other, a long sleeve fixed on the shaft and extending from the pinion to the driving member, an angular contact raceway at the end of the sleeve adjacent to the pinion and an angular contact raceway at the end of the sleeve adjacent to the driving member, rolling elements running on the raceways, outer race rings mounted for axial movement within the bore, a split sleeve for holding the outer race rings spaced apart, means for adjustably limiting the axial movement of the sleeve in one direction, a ring engaging the end of one of the outer race rings, and means for clamping said ring to the tubular carrier; substantially as described.

4. In an axle construction having a pinion shaft subject to end thrust, a tubular carrier projecting from the axle and having a smooth unbroken bore extending to its open end, a flange at the end of the tubular carrier, spacing washers fitting against the flange, a sleeve fixed on the shaft and having widely spaced angular contact raceways, rolling elements running on the raceways, outer race rings mounted for axial movement within the bore, a sleeve for holding the outer race rings spaced apart, a ring engaging the end of one of the outer race rings, and means for clamping the ring against said outer race ring and the spacing washers; substantially as described.

5. In an axle construction having a pinion shaft subject to end thrust, a tubular carrier projecting from the axle and having a smooth unbroken bore extending to its open end, a sleeve fixed on the shaft and having widely spaced angular contact raceways, rolling elements running on the raceways, outer race rings mounted for axial movement within the bore, a split sleeve for holding the outer race rings spaced apart, the sections of the sleeve having openings with inclined walls, adjusting screws on the carrier for engaging the inclined walls, and means at the open end of the tubular carrier for clamping the adjacent outer race ring against the sleeve; substantially as described.

6. In an axle construction having a pinion shaft subject to end thrust, a tubular carrier projecting from the axle, a sleeve fixed on the shaft and having widely spaced angular contact raceways, rolling elements running on the raceways, outer race rings mounted for axial movement in the tubular carrier, a split sleeve in the carrier for holding the outer race rings spaced apart, spacing washers resting against an abutment face of the carrier, a ring at the open end of the carrier and engaging the end of one of the outer race rings, and means for clamping the ring to the carrier to hold the outer race ring in the carrier and to hold the spacing washers against the abutment face; substantially as described.

In testimony whereof I hereunto affix my signature.

THOMAS C. DELAVAL-CROW.